United States Patent [19]

Sadovnik et al.

[11] Patent Number: 5,764,317
[45] Date of Patent: Jun. 9, 1998

[54] 3-D VOLUME VISUALIZATION DISPLAY

[75] Inventors: Lev S. Sadovnik, Los Angeles; Alexander Rizkin, Redondo Beach, both of Calif.

[73] Assignee: Physical Optics Corporation, Torrance, Calif.

[21] Appl. No.: 494,334

[22] Filed: Jun. 26, 1995

[51] Int. Cl.$^6$ .................. G02F 1/13; G02F 1/1335; G02F 1/1347; G02F 1/1333

[52] U.S. Cl. .................. 349/5; 349/1; 349/74; 349/86

[58] Field of Search ................. 349/74, 86, 1, 349/5, 89, 92, 7

[56] References Cited

U.S. PATENT DOCUMENTS

| | | | |
|---|---|---|---|
| 4,435,047 | 3/1984 | Fergason | 349/86 |
| 4,472,737 | 9/1984 | Iwasaki | 349/1 |
| 4,670,744 | 6/1987 | Buzak | 349/1 |
| 4,688,900 | 8/1987 | Doane et al. | 349/86 |
| 4,878,741 | 11/1989 | Fergason | 349/86 |
| 4,983,004 | 1/1991 | Takeya et al. | 349/1 |
| 5,113,272 | 5/1992 | Reamey | 349/86 |
| 5,452,113 | 9/1995 | Ikeno | 349/86 |
| 5,523,188 | 6/1996 | Choi | 349/74 |
| 5,539,547 | 7/1996 | Ishii et al. | 349/86 |
| 5,539,548 | 7/1996 | Yamazaki et al. | 349/86 |
| 5,689,316 | 11/1997 | Hattori et al. | 349/74 |

FOREIGN PATENT DOCUMENTS

| | | | |
|---|---|---|---|
| 0 156 615 | 10/1985 | European Pat. Off. | |
| 60-165632 | 8/1985 | Japan | 349/7 |

OTHER PUBLICATIONS

Chen & Sontag, "Representation, Display, and Manipulation of 3D Digital Scenes and Their Medical Applications", Computer Vision, Graphics, and Image Processing, vol. 48, pp. 190–216 (1989).

Kinugasa, Yano, Takigawa & Kawahara, "Characterization of Light Scattering in Nematic Droplet–Polymer Films", SPIE vol. 1665 Liquid Crystal Materials, Devices, and Applications, pp. 57–63 (1992).

Drzaic, "Polymer Dispersed Nematic Liquid Crystal for Large Area Displays and Light Valves", Journal of Applied Physics, vol. 60, No. 6, pp. 2142–2148 (1986).

Erdmann, Doane, Zumer & Chidichimo, "Electrooptic Response of PDLC Light Shutters", SPIE, vol. 1080 Liquid Crystal Chemistry, Physics, and Applications, pp. 32–40 (1989).

(List continued on next page.)

*Primary Examiner*—Anita Pellman Gross
*Attorney, Agent, or Firm*—Nilles & Nilles, S.C.

[57] ABSTRACT

A volumetric multi-layer screen including a plurality of electrically switchable layers that are stacked and coextensive, each of the plurality of electrically switchable layers including: a first transparent dielectric substrate having a first side and a second side; a first transparent electrode coated on the first side of the first transparent substrate; and an electrically switchable polymer dispersed liquid-crystal film coated on the first transparent electrode. The electrically switchable polymer dispersed liquid-crystal film includes a) a host polymer having an index of refraction and b) a nematic liquid crystal having i) an ordinary index of refraction that substantially matches the index of refraction of the host polymer when an electric field is applied across the electrically switchable polymer dispersed liquid-crystal film from the first transparent electrode, and ii) an extraordinary index of refraction that causes visible light to be scattered at a host polymer/nematic liquid crystal interface when the electric field is not applied across the electrically switchable polymer dispersed liquid-crystal film by the first transparent electrode.

22 Claims, 9 Drawing Sheets

OTHER PUBLICATIONS

Lackner, Margerum, Ramos & Lim, "Droplet Size Control in Polymer Dispersed Liquid Crystal Films", SPIE, vol. 1080 Liquid Crystal Chemistry, Physics, and Applications, pp. 53–61 (1989).

Reamey, Montoya & Wartenburg, "Switching Speeds in Nematic Droplet–Polymer (NCAP) Displays: Dependence on Collection Angle and Wavelength", SPIE, vol. 1455 Liquid Crystal Devices and Materials, pp. 39–44 (1991).

Macknick, Jones & White, "High Resolution Displays Using NCAP Liquid Crystals", SPIE, vol. 1080 Liquid Crystal Chemistry, Physics and Applications, pp. 169–173 (1989).

Takizawa, Kikuchi, Fujikake, Namikawa & Tada, "Polymer–Dispersed Liquid Crystal Light Valves for Projection Display", Optical Engineering, vol. 32, No. 8, pp. 1781–1791 (1993).

Stuart & Handschy, "Spatial Light Modulators Key to Optical Computing", Photonics Spectra, pp. 70–72 (1993).

3-D VOLUME VISUALIZATION DISPLAY

BACKGROUND OF THE INVENTION

1. Field of the Invention

The present invention relates generally to the field of three-dimensional volume visualization. More particularly, the present invention concerns three-dimensional volume visualization displays that have a volumetric multi-layer screen. Specifically, a preferred embodiment of the present invention is directed to a volumetric multi-layer screen having a plurality of electrically switchable layers whose optical properties are electrically switchable. The present invention thus relates to volume visualization displays of the type that can be termed a switchable multi-layer display.

2. Discussion of the Related Art

Real-time, three-dimensional image displays have long been of interest in a variety of technical applications. Heretofore, several techniques have been known in the prior art to be used to produce volumetric images. These techniques include computer graphics which simulate three-dimensional images on a two-dimensional display by appealing only to psychological depth cues; stereoscopic displays which mentally fuse two retinal images (left and right) into one image; holographic images which reconstruct the actual wavefront structure reflected from an object; and volumetric displays which create three-dimensional images having real physical height, depth, and width by activating actual light sources within the volume of the display.

Recently several techniques have been used to create volume images. These techniques can be divided into two categories: those that create a true volume image; and those that create an illusion of seeing a volume image. The first category, includes holographic displays, varifocal synthesis, spinning screens and light emitting diode (LED) panels. The second category, includes both computer graphics which appeal to psychological depth cues and stereoscopic imaging based on the mental fusing of two (left and right) retinal images. Stereoscopic imaging displays can be divided into systems that require the use of special glasses, (e.g., head mounted displays and polarized filter glasses) and systems based on autostereoscopic technology that do not require the use of special glasses.

Recently, the autostereoscopic technique has been widely reported to be the most acceptable for real-time full-color three-dimensional displays. However, because of the nature of stereoscopic vision, this technique cannot satisfy the basic requirement of true volume visualization: physical depth cues. No focal accoimmodation, convergence, or binocular disparity can be provided in autostereoscopy and parallax can be observed only from discrete positions in limited viewing zones.

Our brain and eyes work together, using physical depth cues combined with retinal images, to produce visual recognition, understanding and estimation. We also use psychological cues based on our accumulated experience of spatial location. However, we normally rely completely on our physical perception of volume to perform routine tasks.

By using the subtle interplay of color, light, and shadow, a two-dimensional image can create the illusion of three-dimensional perspective by appealing to the viewer's psychological cues. The proliferation of computer-graphics software owes its success to this technique. It is difficult, however, for someone exposed to an environment rich in pictures to recognize how unnatural these depictions are to the brain's imaging system.

Stereoscopy, the mental fusing of two separate images into one, can be simulated by a pair of pictures. Stereoscopic displays suffer from a number of inherent problems. The main problem with stereoscopic displays is that the perspective of the stereoscopic pair is correct for only one distance. Stereoscopic systems also produce depth cues which conflict with physical cues. This mismatch can cause visual confusion and/or fatigue and may contribute to viewer headache that is often developed while watching stereoscopic three-dimensional displays.

What is needed therefore is a display that provides true-volume visualization with real physical depth cues, including focal accommodation, parallax, convergence and binocular disparity. What is also needed is a display that provides full color capability What is also needed is real-time and moving model simulation with a minimum update rate of 30 Hz, so as to be consistent with the persistence of human vision.

In addition, several other conditions must be satisfied for interactive task simulators. These conditions include: the use of icons and pointers; multi-person off-angle viewing; a relatively large screen; no eyeglasses required for viewing; rapid database loading; special effect simulation; atmosphere effect simulation and the ability to simulate conflict interaction between aircraft and automobiles. Given these requirements and conditions, producing true volume visualization with real physical depth cues presents a major challenge for display development.

Recognizing the drawbacks of both the traditional computer graphic technique and stereoscopic imaging, a number of researchers have categorized the problem of volume visualization as an image processing task. This has led to the development of "volume rendering" methods in which the final picture contains information about every element within the object's volume. The elements are called "voxels" (an analogy to the pixels in digital images). The typical problem associated with volume rendering is that for each voxel to have some effect on the final picture it must absorb or scatter some of the light passing through it. Unfortunately, after passing through just a few of these voxels, the light will inevitably be attenuated. The dilemma faced by a voxel is to have high enough opacity to be significant to the final picture but not conceal all the voxels behind it. Heretofore these mutually contradictory requirements appeared to be unresolvable. Further, the final display is still only two-dimensional and most of the physical depth cues are missing since it is difficult to apply perspective cues to soft-edged objects. This "cloud-in-a-cloud" problem requires extra depth cues to provide information on the distances between related portions of an object.

Recent work has concentrated primarily on the development of various stereoscopic viewing systems. Regardless of the device realization, stereoscopic displays suffer from a number of inherent problems. The primary problem is that any stereoscopic pair gives the correct perspective when viewed from one position only. Thus, stereo display systems must either sense the position of the observer, regenerating the stereo pair with different perspectives as the observer moves, or the observer's head must be in a fixed position. Misjudgments of distance, velocity and shape occur because of the lack of physical cues. Stereo systems always give depth cues that conflict with convergence and physical cues because the former use fixed focal accommodation, and, thus disagree with the stereoscopic depth information provided by the latter. This mismatch causes visual confusion and fatigue, and is part of the reason for the headaches that many people develop when watching stereoscopic three-dimensional images.

Autostereoscopic systems allow images to be viewed from a limited number of fixed viewing angles without glasses. But again, no physical depth cues can be obtained with this type of system. In addition, special sensing systems which track the position of the viewer's head and make corrections to maintain the three-dimensional effect must often be used. Alternatively, only a limited space (the so-called viewing zone) is available for three-dimensional image observation.

Liquid crystals have been previously used in optical devices. U.S. Pat. No. 4,435,047, the entire disclosure of which is hereby expressly incorporated by reference into the present application for purposes including, but not limited to, indicating the background of the present invention and illustrating the state of the art, discloses encapsulated nematic liquid crystal.

SUMMARY OF THE INVENTION

Expanding on the principles of volume visualization, the present invention is a new approach to three-dimensional image representation that does not jeopardize any physical depth cues while avoiding the voxel dilemma described above. In a preferred embodiment, the present invention includes a true-volume display (TVD) that implements true-volume image integration (i.e., the supra position of a timed sequence of two-dimensional images (slides) projected on a volumetric multi-layer screen at a rate that satisfies the persistence of vision of the human eye). The present invention can advantageously utilize recent advances in liquid crystal development and treats a three-dimensional scene as a set of two-dimensional cross sections, or slices.

It is therefore an object of the invention to provide a volumetric display that will create full-color, synthetic three-dimensional images from digitized data that can be previously acquired and stored. Recent advances in high-speed image acquisition, coupled with high-speed video recording, will permit imaging a three-dimensional scene in real time.

Another object of the invention is to provide for focal accommodation (the change in the focal length of the eye's lens). This subconscious function occurs rapidly and is an accurate means of sensing the distance to a nearby object.

Another object of the invention is to provide for convergence (coordinated turning of both eyes to look at an object). This action is also subconscious and enables accurate physical sensing of near-range distance.

Another object of the invention is to provide for motion parallax (the cross-movement of objects in the field of view (FOV) in which closer objects seem to move more rapidly than distant ones). This motion can be caused by the motion of the observer or by subtle, ever-present motions of the eyeballs of the viewer.

Yet another object of the invention is to provide for binocular disparity (the double-image of an object seen when the eyes converge on another object at a different distance). Binocular disparity occurs for those images which are not the current focus of attention, thus giving another physical indication of the relative distances of objects within the visual field.

In accordance with a first aspect of the invention, these objects are achieved by providing a volume visualization display system comprising: a volumetric screen controller; a projector interface connected to said volumetric screen controller; a volumetric screen interface connected to said volumetric screen controller; a liquid-crystal spatial light modulator color projector connected to said projector interface; and a volumetric screen monitor connected to said volumetric screen interface, wherein said volumetric screen monitor includes a volumetric multi-layer screen, said volumetric multi-layer screen including a plurality of electrically switchable layers that are stacked and coextensive, each of said plurality of electrically switchable layers including: a first transparent dielectric substrate having a first side and a second side; a first transparent electrode coated on said first side of said first transparent substrate; and an electrically switchable polymer dispersed liquid-crystal film coated on said first transparent electrode, said electrically switchable polymer dispersed liquid-crystal film including a) a host polymer having an index of refraction and b) a nematic liquid crystal having i) an ordinary index of refraction that substantially matches the index of refraction of the host polymer when an electric field is applied across said electrically switchable polymer dispersed liquid-crystal film from said first transparent electrode and ii) an extraordinary index of refraction that causes visible light to be scattered at a host polymer/nematic liquid crystal interface when said electric field is not applied across said electrically switchable polymer dispersed liquid-crystal film by said first transparent electrode. Preferably, said host polymer includes at least 20% by weight fluorinated polymer and said electrically switchable polymer dispersed liquid-crystal film has an off-time of less than approximately 10 milliseconds, preferably less than approximately 5 milliseconds.

Still another object of the invention is to provide a volumetric multi-layer screen that has one or more of the characteristics discussed above but which is relatively simple to manufacture and assemble. In accordance with this aspect of the invention, this object is achieved by providing a method comprising fabricating a plurality of electrically switchable layers; and laminating the plurality of electrically switchable layers together so that said plurality of electrically switchable layers are stacked and coextensive, wherein fabricating the plurality of electrically switchable layers includes, for each of the plurality of electrically switchable layers, providing a first transparent substrate having a first side and a second side; coating said first side of said transparent substrate with a first transparent electrode; and forming an electrically switchable polymer dispersed liquid-crystal film on said first transparent electrode, said electrically switchable polymer dispersed liquid-crystal film including a) a host polymer and b) a nematic liquid crystal. Preferably, forming said electrically switchable polymer dispersed liquid-crystal film on said first transparent electrode includes emulsifying said nematic liquid crystals in an aqueous solution of polymer matrix to form an emulsion, coating said emulsion onto said first transparent conductive electrode and drying said emulsion.

Still another object of the invention is to provide a method of operating a volumetric multi-layer screen. In accordance with this aspect of the invention, this object is achieved by providing a method comprising a) providing a volumetric multi-layer screen with a plurality of electrically switchable layers, each of said plurality of electrically switchable layers including: a first transparent dielectric substrate having a first side and a second side; a first transparent electrode coated on said first side of said first transparent substrate; and an electrically switchable polymer dispersed liquid-crystal film coated on said first transparent electrode, said electrically switchable polymer dispersed liquid-crystal film including A) a host polymer and B) a nematic liquid crystal; b) generating i) a first cross-section perpendicular to a direction of viewing from a stored three dimensional image and ii) a second cross-section perpendicular to said direction of viewing from said stored three dimension image; c) applying a first electric field to a first of said electrically switchable layers so as to switch said first of said electrically switchable layers to a first optically transparent state; d) projecting said first cross-section through said first of said electrically switchable layers; e) removing said first electric field from said first of said electrically switchable layers so as to switch said first of said electrically switchable layers to a first optically diffuse state; f) applying a second electric field to a second of said electrically switchable layers so as to switch said second of said electrically switchable layers to a second optically transparent state; g) projecting said second cross-section through said first of said electrically switchable layers; h) removing said second electric field from a second of said electrically switchable layers so as to switch said second of said electrically switchable layers to a second optically diffuse state; and i) repeating b), c), d), e), f), g) and h). Preferably, repeating b), c), d), e), f), g) and h) takes place at least approximately 30 times each second.

An effect of the present invention is to generate a volumetric display.

Other aspects and objects of the present invention will be better appreciated and understood when considered in conjunction with the following description and the accompanying drawings. It should be understood, however, that the following description, while indicating preferred embodiments of the present invention, is given by way of illustration and not of limitation.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views and in which.

DESCRIPTION OF PREFERRED EMBODIMENTS

The present invention and various features and advantageous details thereof are explained more fully with reference to exemplary, and therefore non-limiting, embodiments described in detail in the following disclosure and with the aid of the drawings.

Figure 1:
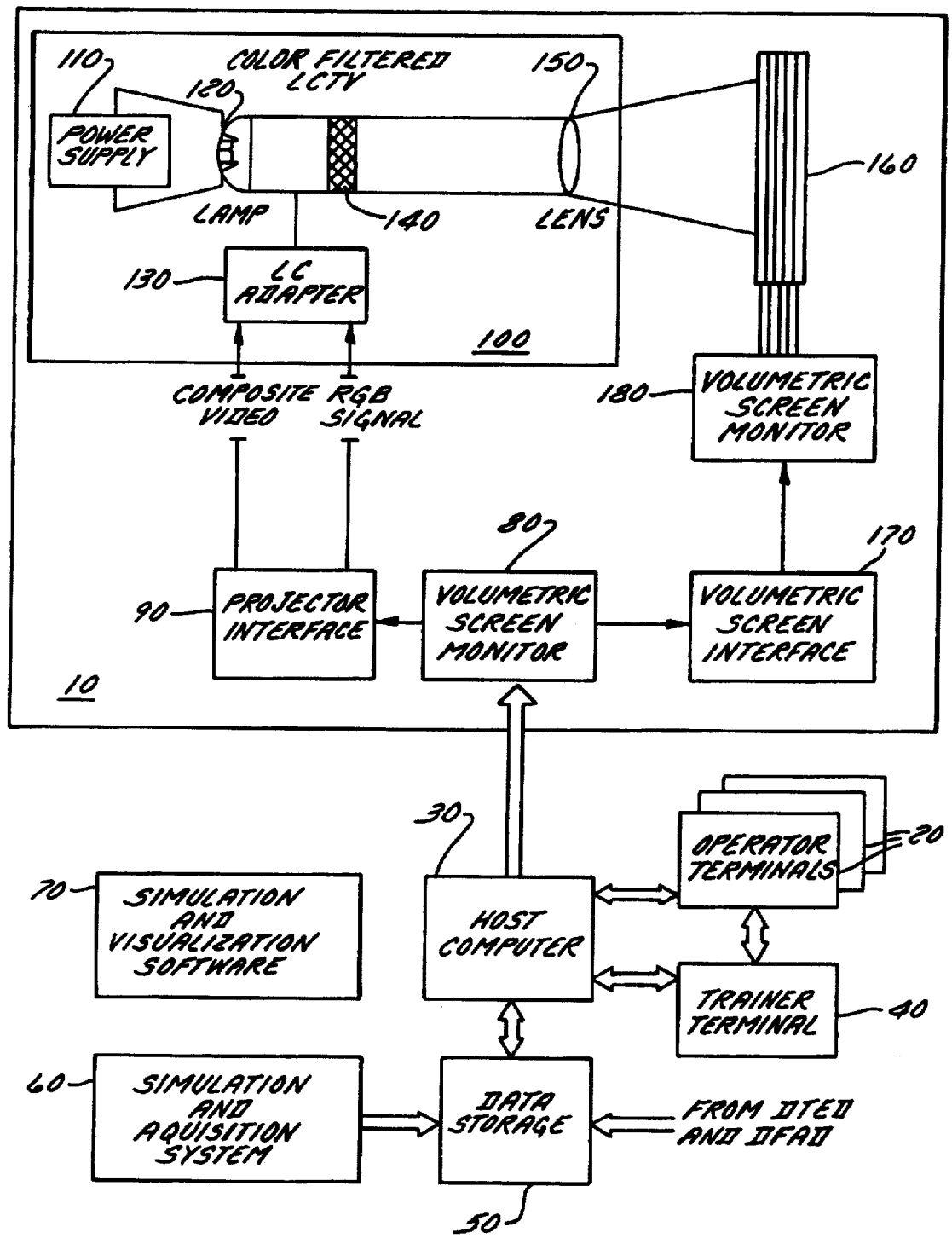
FIG. 1 illustrates a block view of a multi-user interactive multi-media system according to the present invention.

Referring to FIG. 1, a presentation system including volumetric display 10 is depicted as including multiple operator terminals 20. Multiple operator terminals 20 are connected to host computer 30, as is trainer terminal 40. Host computer 30 is connected to data storage 50. Data storage 50 is provided with data from simulation and acquisition system 60 as well as other appropriate data sources. Simulation and visualization software 70 permits the orderly exchange of data between the aforementioned elements. Display data from host computer 30 is provided to volumetric display 10 through volumetric screen controller 80. Volumetric screen controller 80 is connected to projector interface 90. Projector interface 90 is in turn connected to projector 100. Projector 100 includes power supply 110 and lamp 120. Composite video and red-green-blue (RGB) signal data from the projector interface 90 is provided to liquid crystal adapter 130. Liquid crystal adapter 130 controls color filtered liquid crystal television 140. Light from lamp 120 passes through color filtered liquid crystal television 140 and through lens 150 toward volumetric screen 160. Data from volumetric screen controller 80 is provided to volumetric screen interface 170. Volumetric screen interface 170 controls volumetric screen monitor 180 which includes volumetric screen 160.

A presentation scenario, prepared in the form of digitalized images and data using simulation and acquisition system 60 as well as other appropriate forms of data is stored in data storage 50. Trainer terminal 40 allows for the customization of the presentation by, for example, placing models, choosing special and atmospheric effects, simulating the time-of-day and manipulating icons and pointers.

True volume scenes, in real-time and in full color, appear within volumetric screen 160 and do not require eye glasses for multi-person off-angle viewing. The presentation system can give multiple trainees the illusion of participating in a situation by entering commands on individual operator terminals 20. In a more generic embodiment, color filtered liquid crystal television (LCTV) 140 can be any spatial light modulator.

Several different full-color liquid-crystal matrix-based video projectors that are suitable for use as LCTV 140 have recently become readily commercially available (e.g. for example, the Panasonic PT-10L liquid crystal display where the active matrix consists of 239×272 pixels). The parameters of a selected projector can be modified for a proposed application. Spatial light modulator frame rates have been reported at the 10 kHz level. Some improved spatial light modulators rely on the electro-optic properties of ferroelectric liquid crystal (FLC). This type of spatial light modulator is available from Display Tech, Seiko, Thorn EMI, Epson and NTT.

An IBM 486 PC can be used as the basic element of volumetric screen controller 80. Without being bound by theory it is believed that projector-bus real-time throughput for in-plane resolution of 239×372 pixels and 50 layers in volumetric screen 160 must be on the order of 400 Mbyte/sec. Several high-performance, high-resolutions systems are now readily commercially available (e.g., IMGRAPH, Recognition Concepts, Parsytec). These high speed frame grabbers have an open architecture that provides flexibility for programming and expansion.

The functions of volumetric screen monitor 180 are synchronization and distribution of the frame signals from the volumetric screen controller 80 to the volumetric screen 160. The number of channels must be equal to the number of layers in the volumetric screen 160 and the input must be compatible with the volumetric screen controller 80. Because of the relatively high voltage (60/100 V AC, 60 Hz) used for polymer dispersed liquid crystal layer switching, the volumetric screen monitor 180 must have an isolated output interface. Other electrical parameters (e.g., current, and power) can be determined after selecting such specific parameters of the system as screen size and number of layers. On the average, power of approximately 20 watts per square meter of polymer dispersed liquid crystal surface is required for polymer dispersed liquid crystal switching.

The key element of the system is the volumetric screen 160. It consists of multiple layers of electrically switchable polymer dispersed liquid crystal (PDLC) film separated by thin transparent dielectric films (or by sheets of glass) coated with transparent electrodes. A stack of such layers forms a volumetric screen 160 to display a real-time, full-color, 3-D image.

It is the optical properties of the PDLC that are electrically switchable. Specifically the PDLC film acts as a diffuser when no voltage is applied. Further, under voltage, the film becomes fully transparent. The screen is rapidly switchable from a diffusing (scattering) state to a transparent state. A 3-D image stored in the host computer 30 (or obtained by other means) is used to generate (slice) a number of cross-sections perpendicular to the direction of viewing. Each sliced projection is synchronized in time with the activation of one layer of the volumetric screen 160. By sequentially repeating this process for each image slice (each respective display layer), the observer will have a view of a full 3-D image encompassing all the volumetric depth effects, including stereoscopy and head motion. Because of the persistence of human vision, sufficiently rapid sequential switching of images produces the perception of continuous motion. The switching for all of these image slices must thus be within an appropriate frame rate (e.g., 30 Hz). As a result, volumetric screen 160 allows volumetric full-color images with physical depth cues to be viewed in real-time.

If the switching time for the screens is within the range of the persistence of human vision, the consecutively projected slices will be integrated into synthetic volumetric images in the same manner in which the appearance of movement is obtained by viewing a set of rapidly switched still frames. The switching for all of these image slices should therefore, be within an appropriate TV-frame rate, (typically 30 Hz). This display, in contrast to stereoscopic systems, allows real volume images to have physical depth cues (e.g., focal accommodation, parallax, convergence and binocular disparity). The volumetric screen uses physical depth cues of parallax and vignetting to convey the changing three-dimensional relationship between multiple objects that are moving in relationship to one and another which occur when a viewer changes his or her viewing direction. Stereoscopy systems cannot produce pictures which convey these volumetric effects.

Figure 2:
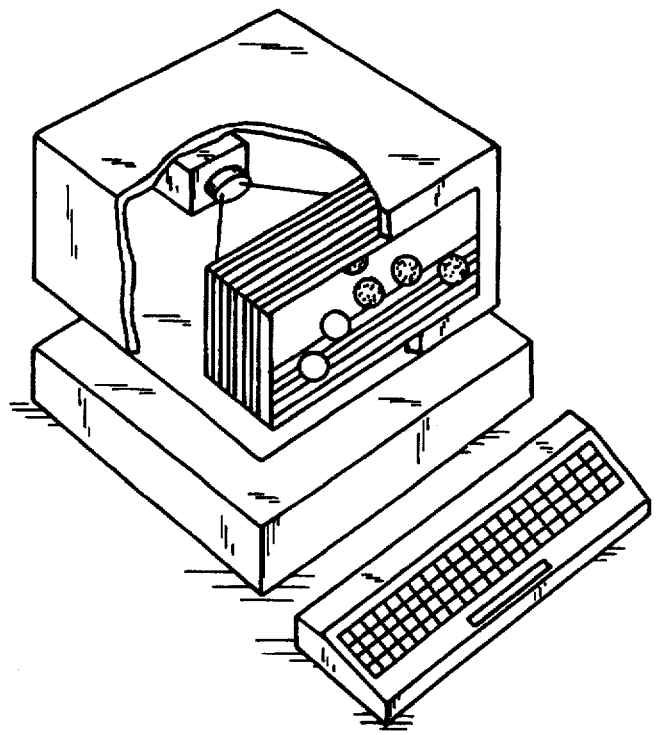
FIG. 2 illustrates an isometric view of a volumetric display according to the present invention.
Figure 3:
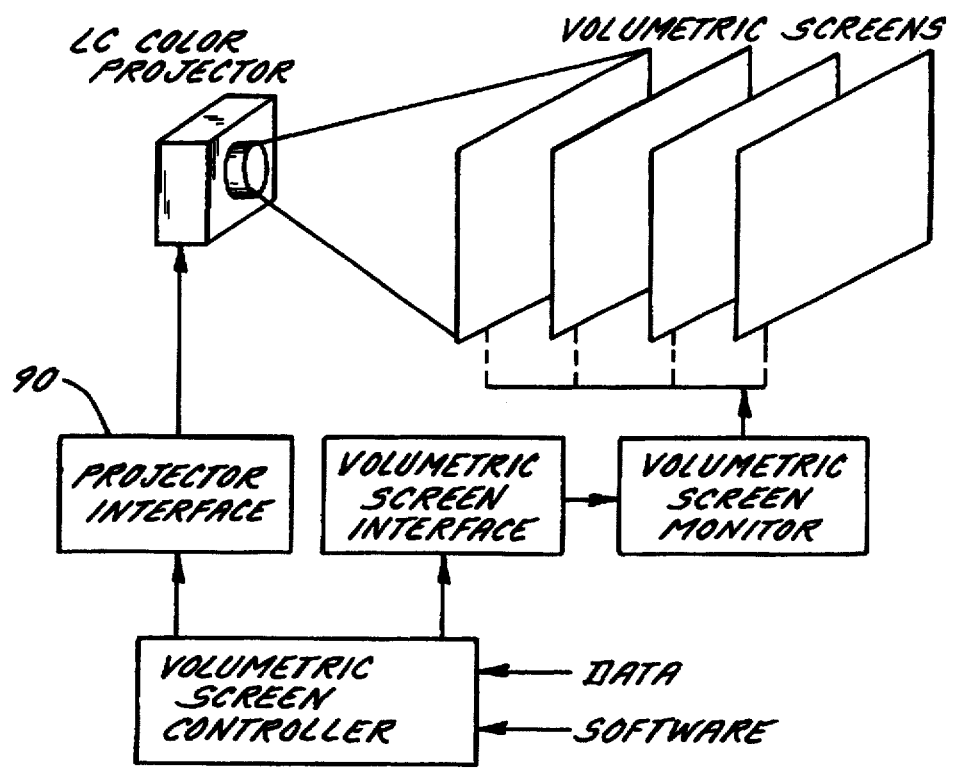
FIG. 3 illustrates a hybrid block diagram of the volumetric display shown in FIG. 2.
Figure 4A:
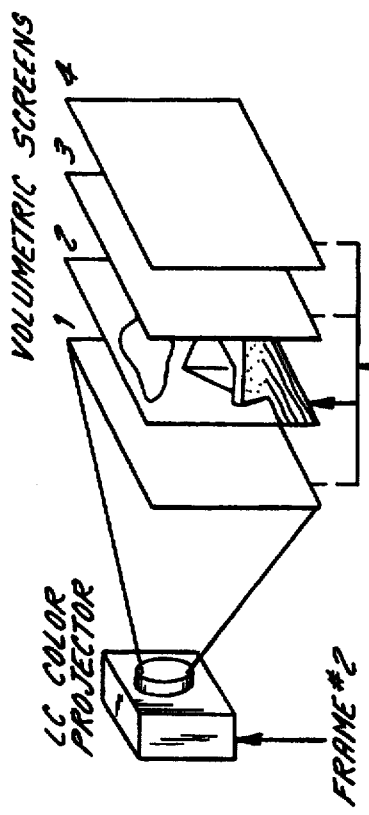
FIGS. 4A-4D illustrate a series of projected frames according to the present invention.
Figure 4B:
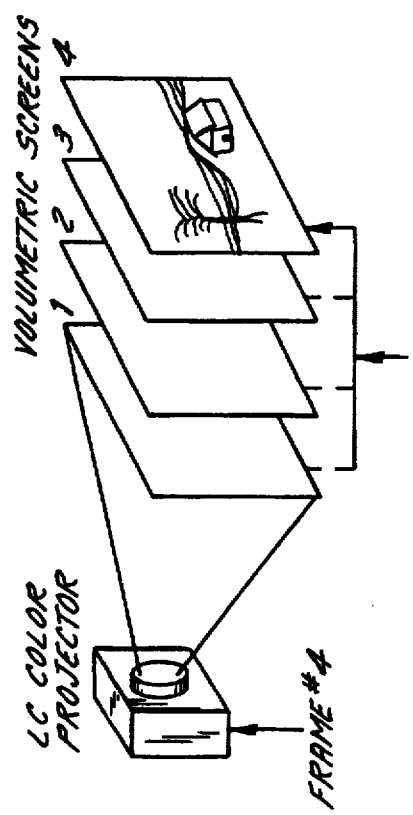
Figure 4C:
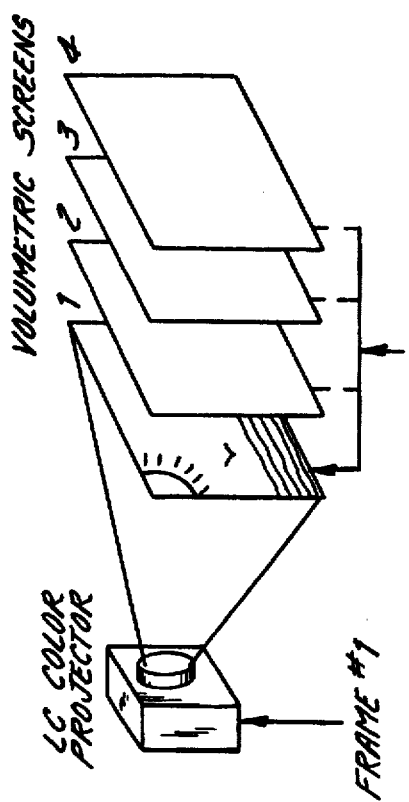
Figure 4D:
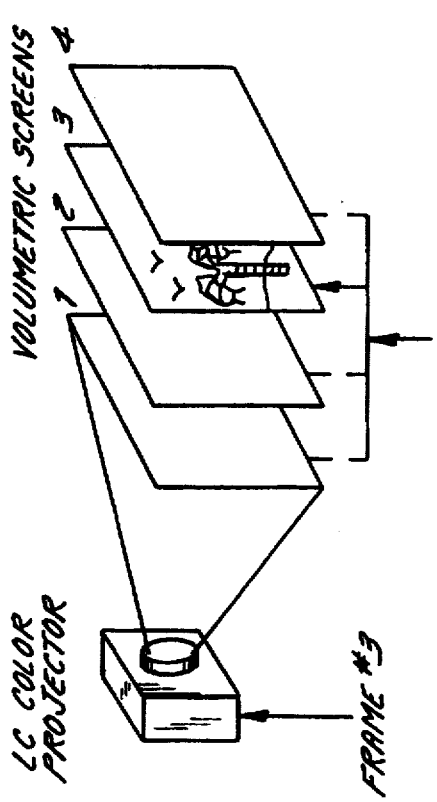

Although the illusion of perspective can cause an image to be perceived as three-dimensional, volumetric screen 160 manifests real perspective. Referring to FIG. 2, the unshaded balls that are closest from the depicted perspective are brighter and larger than the shaded balls that are further away. Referring to FIG. 3, although volumetric screen 160 is fully capable of providing full-color images, the demands placed upon projector interface 90 as well as projector 100 are reduced by operating the volumetric display 10 monochromatically.

Referring to FIGS. 4A–4D objects depicted by volumetric screen 160 can move in two different directions. Objects can move across a single screen (X, Y plane) and across several different screens (i.e., in the Z-axis direction). Displaying object movement is possible, independently of the direction of movement, if the rate of persistence of human vision is satisfied.

In a preferred embodiment volumetric screen 160 comprises from approximately 20 to approximately 30 layers with a total transmission rate of from approximately 5% to approximately 10%. In order to obtain high performance, the polymer dispersed liquid crystal switching times for each of the layers of volumetric screen 160 should be no more than 1 millisecond. Consequently, data from projector interface 90 is advantageously provided to projector 100 at a rate of not less than 1 kilohertz.

Polymer dispersed liquid crystal (PDLC) composites, also known as nematic droplet-polymer film (NDPF) composites, involve the encapsulation of nematic liquid crystal in a polymer host. The encapsulation results in curvilinear alignment of the nematic liquid crystal. The resulting curvilinearly aligned phases can be optically switched by an electric field. In comparison to twisted nematic cells, the PDLC system, which includes the nematic liquid crystal, has faster switching and improved viewing angles, and is easier to make into large panels. PDLC screens are also brighter because they do not use polarizers.

Figure 5A:
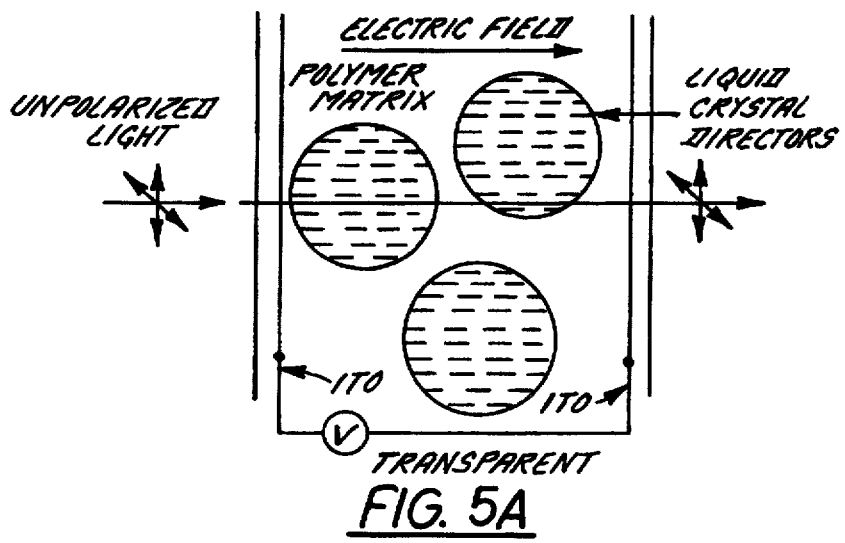
FIGS. 5A and 5B illustrate an electrically switchable layer according to the present invention in an "on condition" and an "off condition," respectively.
Figure 5B:
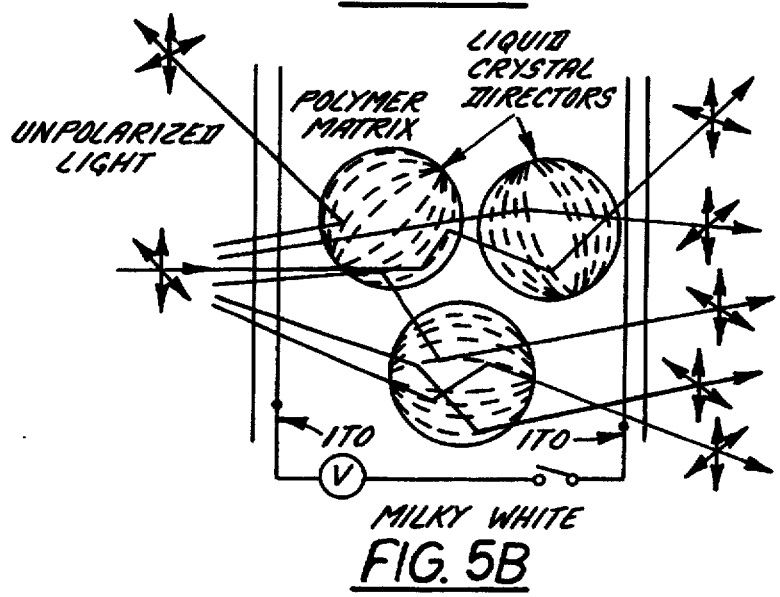

PDLC is coated or laminated between glass or plastic surfaces that have been coated with transparent electrodes. The electrodes permit an electric field to be applied across the PDLC material. Nematic liquid crystal which has an ordinary index of refraction that matches the index of refraction of the host polymer is selected for use in the PDLC. When an electric field is applied, the liquid crystal is aligned so that the material becomes transparent (see FIG. 5A). When the field is off, the mismatch of the liquid crystal's extraordinary refractive index causes light to be scattered at the liquid crystal/polymer interface, producing a milky-white surface (see FIG. 5B).

PDLC materials have several important properties which are advantageous for video display applications. These properties include: size, contrast ratios and brightness.

In contrast to twisted nematic cells, that require a uniform alignment of layers over large areas and stringent liquid sealing for the liquid crystal itself. PDLC cells are less complex because the coating can utilize a relatively simple lamination process. The PDLC cell thickness is produced and controlled in a separate coating operation. Conventional equipment exists for continuous production of PDLC coating up to 1 meter wide. Very large picture areas (e.g., from approximately 2 to approximately 3 meters on the diagonal) can be produced by using mosaic tile constructions, because no electrical connections are needed between tiles.

Figure 6:
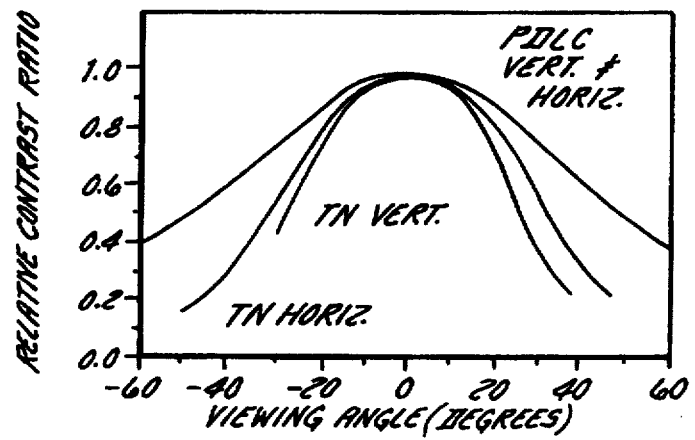
FIG. 6 illustrates a comparison of contrast ratio as a function of viewing angle for twisted nematic (TN) liquid crystals and polymer dispersed liquid crystals.

Contrast ratios greater than 100:1 can be achieved with highly columninated beams. In practice, 40:1 ratios can be easily achieved with f/5.0 projection lenses. The uniformity of the contrast ratio over the field of view is good. Referring to FIG. 6, a comparison of contrast ratios as a function of viewing angle obtained by various technologies is depicted.

The maximum contrast ratios in both vertical and horizontal directions for PDLC is similar to that attained by twisted nematic liquid crystals. However, the viewing angle with PDLC is approximately two times wider at approximately same contrast ratio than with twisted nematic liquid crystals, as depicted in FIG. 6.

The transmission through PDLC materials can reach about 90%. That is at least twice the transmission obtainable through twisted nematic crystal displays, because polarized inefficiencies and interfacial losses have been eliminated.

Figure 7:
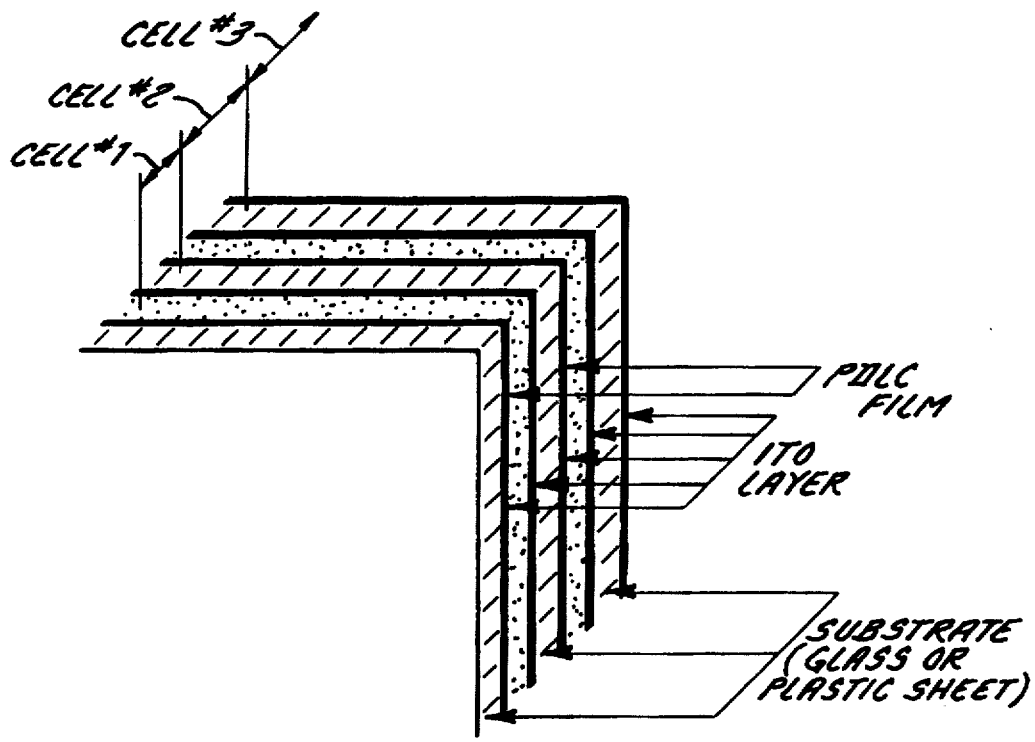
FIG. 7 illustrates an isometric view of a volumetric screen design according to the present invention.

Referring to FIG. 7, a volumetric screen design concept according to the present invention is shown. This design includes a stack of multilayer cells of similar design so that the stack size can be customized to meet specific requirements. Each cell consists of two substrates (glass or plastic sheets) coated with indium tin oxide (ITO) and containing a layer of PDLC between coated surfaces. In order to decrease the weight and thickness of the volumetric screen and increase the volume resolution, each substrate (except the ones in the front and in the back) can be used for two adjoining cells. This is accomplished by coating both sides of the intermediate substrates with indium tin oxide. The volume resolution of the volumetric screen, $\Delta z$, depends on two parameters: the depth of the projected field (DPF), z, and the number of cells in the stack, N, such that $$\Delta z = z/N \qquad \text{(Eq. 1)}$$

Figure 8:
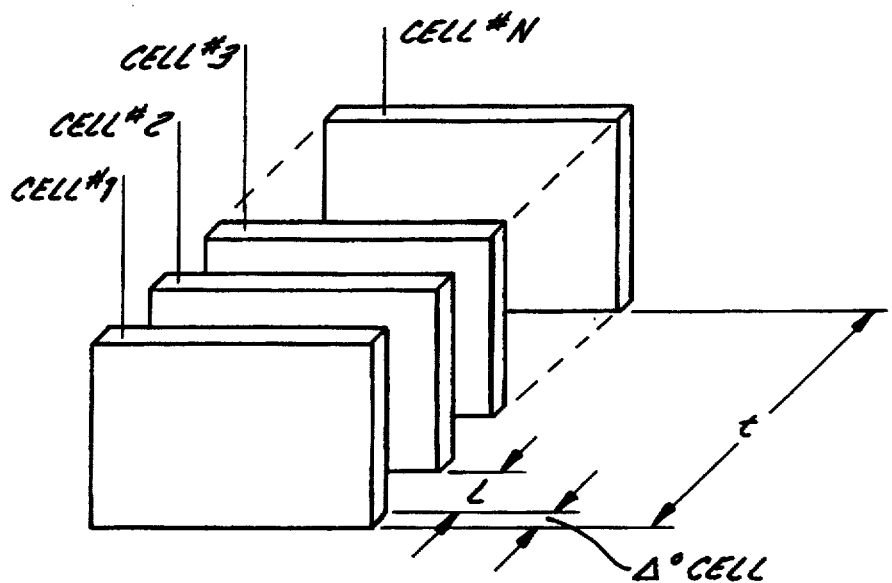
FIG. 8 illustrates an increased depth of projected field volumetric screen design according to the present invention.

For the basic design $$\Delta z = \Delta_{cell} = p + 2\delta + d \qquad \text{(Eq. 2)}$$

where $\Delta_{cell}$ is the thickness of one cell, p is the thickness of the substrate, $\delta$ is the thickness of the ITO layer, and d is the thickness of the PDLC. In some cases, when a larger DPF, z', is required, $\Delta Z \neq_{cell}$ since the number of cells, N, will be limited by the switching time and the persistence of human vision. In the case when z'>z, an alternative design of the volumetric screen is implemented and the cells are separated by an additional distance l, as shown in FIG. 8.

The cell thickness becomes $$\Delta_{cell} = 2p + 2\delta + d \qquad \text{(Eq. 3)}$$

and $$z' = (\Delta'_{cell} + l)N \qquad \text{(Eq. 4)}$$

or, assuming the limitation on the number of cells, N, $$l = (z' - \Delta'_{cell} \cdot N)/N \qquad \text{(Eq. 5)}$$

This results in a volume resolution $$\Delta z = z'/N = 2p + 2\delta + d + l \qquad \text{(Eq. 6)}$$

A PDLC screen according to the present invention can be provided so as to not produce a visible degradation in image resolution. In this case, the in-plane resolution of the volumetric screen 160 and the screen size depend mostly on projection system parameters. A commercially available projector that is appropriate for use with the present invention is a Panasonic model PT-10L liquid crystal display video projector. This projector uses a thin film transistor (TFT) active matrix liquid crystal display (LCD) panel, consisting of 88,908 pixels. The size of a pixel is approximately 34 microns. In a full-color projected picture, the vertical resolution of the image is about 200 television lines. A non-spherical condenser lens combined with a halogen lamp and lens (F2.1, F=40 mm) provide a projection image up to 70 inches in diagonal measurement. The maximum preferable size of the screen is reduced by light/power requirements and the PDLC fabrication technology.

As noted above, the objects of the present invention include a true volume, color image in real-time that is in the range of the persistence of human vision. There are two key factors contributing to the real-time performance: the volumetric screen switching speed and the information capacity of the video interface.

In a PDLC composite, a liquid crystal mixture exhibiting positive dielectric anisotropy is dispersed in an anisotropic polymer matrix in the form of a micron or submicron size droplets. Such a PDLC composite can be cast into a thin film that has a translucent appearance if there is a mismatch between the refractive index of the liquid crystal droplets and the refractive index of the polymer matrix. Under an applied voltage, the thin film changes to an optically transparent state, provided that the ordinary refractive index of the liquid crystal droplets matches the refractive index of the polymer. Suitable PDLC composites can employ cholesterics, ferroelectrics and high frequency addressable (HFA) liquid crystal mixtures.

PDLC materials are usually prepared using liquid-crystal blends and polymers as the matrix materials. For example, a glass substrate is coated with a transparent conductive electrode of indium tin oxide. Liquid crystals are emulsified in an aqueous solution of polymer matrix. The emulsion is coated onto the transparent conductive electrode. The emulsion layer is then allowed to dry. The cell is fabricated by lamination of this structure with a cover glass that is also coated with indium tin oxide.

The basic parameters of the PDLC can be controlled by adjusting the fabrication steps, as shown in the following table.

| Adjustments to the Fabrication Procedure to Control Basic Parameter of PDLC | |
|---|---|
| PDLC Parameter | Controlled Preparation |
| Distribution of nematic droplets of different diameters | Mix two or more emulsions |
| Density of nematic droplets | Change the volumetric content of nematic liquid crystals with the desired diameter |

-continued

| Adjustments to the Fabrication Procedure to Control Basic Parameter of PDLC | |
|---|---|
| PDLC Parameter | Controlled Preparation |
| Shape of nematic droplets | Change the drying conditions of the emulsion |
| Cell thickness | Change the coating thickness of the nematic emulsion |

Among the many commercially available matrix polymers, polyvinyl formal polymer (PVFM), fluroralkylacralate (DMMA/FC-725), ultra-violet curable Norland 65 or Thermo-Set Polymer WC97 are appropriate for providing a high switching rate and good contrast characteristics. The switching time can be measured using a helium-neon laser as a light source. Preferred polymer compositions can be identified by applying a bipolar square wave to the sample using a function generator (e.g., Hewlett-Packard 3324A) and a bipolar amplifier. In order to analyze the results, a digital oscilloscope can be used to monitor both the transmitted light intensity and the driving voltage.

The PDLC thickness and liquid crystal droplet size can also be optimized. For a selected polymer matrix, the PDLC formation should be optimized to achieve a desired switching rate at a minimal operating voltage. The intensity of ultraviolet light curing during formation can be used to control the liquid crystal droplet size in the PDLC. Specifically, lower ultraviolet light formation intensities produce PDLC with lower threshold and operating voltages because larger liquid crystal droplets are formed. Slow curing rates also result in fewer liquid crystal droplets and higher offstate transmission. It is anticipated that intermediate droplet size (from intermediate UV-curing intensity) would be best for high frame rate displays. Thickness also effects switching time and operating voltage.

Each of the layers can also be formed by mixing two or more emulsions. Optimum combinations of emulsions can be identified in the same way that optimum single emulsion containing films are identified.

For each PDLC layer, two other types of formation can also be utilized. In a permeation method, liquid crystal penetrates a number of micron size pores formed in a transparent polymer matrix.

The layers can also be formed with a nematic curvilinear aligned phase (NCAP) method that utilizes a milky solution produced by mixing liquid crystal and water-soluble polymers such as polyvinyl alcohol. When coated on a thin film substrate with transparent electrodes, liquid crystal droplets are formed in the polymer by evaporating the solvent.

Figure 9B:
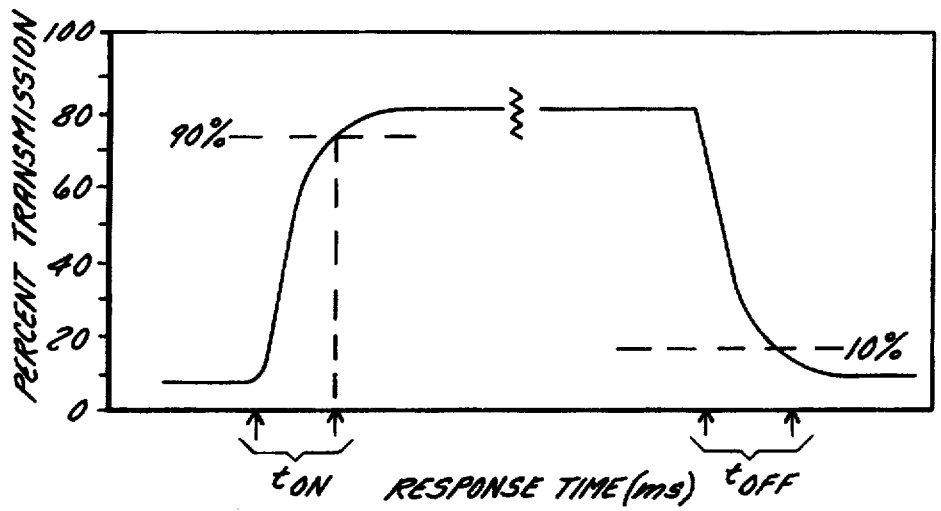
FIGS. 9A and 9B illustrate an applied signal and the resulting optical response of a polymer dispersed liquid crystal according to the present invention, respectively.
Figure 9A:

Switching speed is a critical performance parameter of a PDLC display. Referring to FIGS. 9A and 9B, a method of determining switching speed is depicted. Referring to FIG. 9A, the sample is addressed with a drive signal. Referring to FIG. 9B, the rise (on) time $T_{ON}$ is defined as the time between the application of the electrical signal and the instance when the optical response reaches 90% of the total optical change. The decay (off) time $T_{OFF}$ is the time between the termination of the signal and the instant when the optical signal falls to 10% of the total optical change. Switching time is a key parameter to be optimized. Switching time is controlled by several factors: the surface energy at the polymer-liquid crystal interface; the inherent properties of the liquid crystals (viscosity, elastic constant, dielectric and anisotropy); the shape, size and structure of the liquid crystal droplet; the amplitude of the driving electric field and the film thickness.

The switching speeds of twisted nematic displays are determined by the viscosity of the liquid crystal mixtures and the cell gap. For twisted nematic displays, cell gaps of approximately 4 microns are already at the first minimum of the Goosh-Terry Curve and cannot be decreased much further.

Figure 10A:
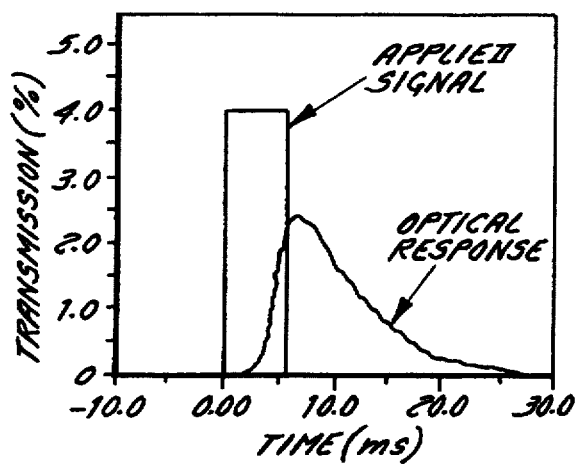
FIGS. 10A and 10B illustrate the optical responses of a twisted nematic liquid crystal cell and a polymer dispersed liquid crystal, respectively.
Figure 10B:
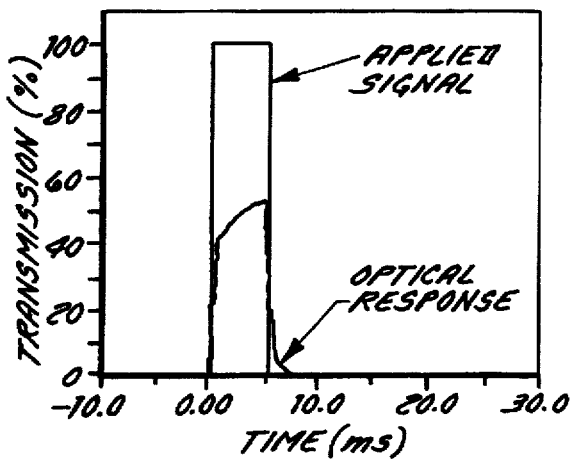

In contrast, according to the present invention, the effective cell gap of PDLC layers are determined by the liquid crystal droplet diameter, which is less than the Goosh-Terry first minimum. In addition, the curvilinear nature of the droplets gives a greater surface area to volume ratio than the planar geometry of the twisted nematic cell. Since the turn-off response is a diffusion process, the larger surface area to volume ratio allows faster switching. Referring to FIGS. 10A and 10B, a comparison of the optical responses of twisted nematic liquid crystals and polymer dispersed liquid crystals is depicted.

Figure 11:
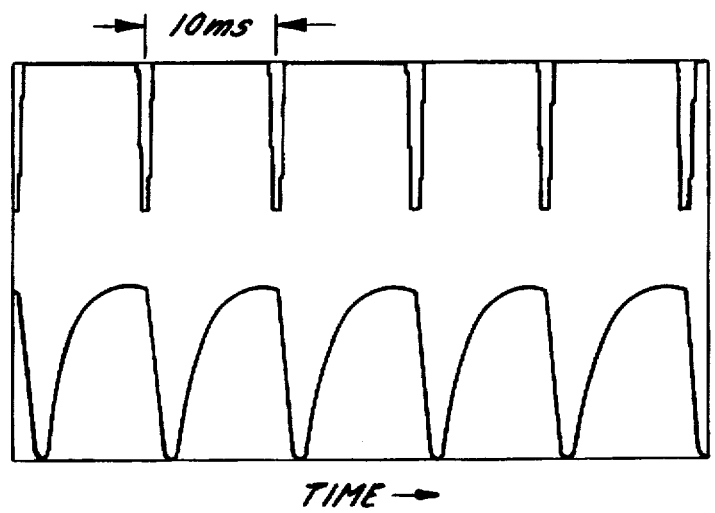
FIG. 11 illustrates an applied driving pulse signal and the resulting polymer dispersed liquid crystal switching according to the present invention.

As noted above, switching speed depends upon a number of factors. These factors include the matrix polymer or polymer combination, the type of liquid crystal, the droplet size, the droplet shape, the frequency of applied voltage (low, high, dual frequency), the shape and rms (root mean square) value of the signal applied and the wavelength of light. Although most previously reported polymer dispersed liquid crystal switching speeds are relatively slow (on the order of 100 milliseconds) the switching speeds can be much faster, on the order of one millisecond. Referring to FIG. 11, driving pulses of one millisecond can result in switching.

One promising approach from a fast switching response standpoint is a dual frequency addressable liquid crystal (DFA-LC) mixture that can be driven by the alteration of sequential low and high frequency fields.

All droplets do not switch simultaneously, due to shielding effects and differences in droplet size and shape. Therefore, the transmittance of PDLC increases smoothly as a function of the applied electric field from an off-state value to a maximum value. A commonly used parameter is the voltage required to achieve 90% of the increased transmittance due to the applied field or $V_{90}$. Assuming a bipolar droplet configuration, $$V_B = \frac{d}{3r} \left( \frac{P_p}{P_{LC}} + 2 \right) \sqrt{\frac{K(a^2-1)}{\Delta \epsilon \cdot \epsilon_o}} \qquad \text{(Eq. 7)}$$

where $V_B$ is the threshold voltage, d is the PDLC film thickness, r is the droplet radius, a is the droplet aspect ratio, K is the mean elastic constant of the liquid crystal, $P_p$ is the resistivity of the polymer, $\rho_{LC}$ is the resistivity of the liquid crystal, and $\Delta \epsilon \cdot \epsilon_o$ is the dielectric anisotropy of the liquid crystal. Eq. 7 suggest that $V_{90}$ should decrease linearly with decreasing thickness.

The visible light transmittance of a PDLC is understood in terms of the scattering efficiency of the droplets, $$I_T = I_o \exp(-\beta \sigma d) \qquad \text{(Eq. 8)}$$

where $I_o$ is the intensity of the incident light, $\beta$ is the density of the droplets; $\delta$ is the scattering cross section of a single droplet, and d is the optical path length (PDLC thickness for normally incident light).

Figure 12:
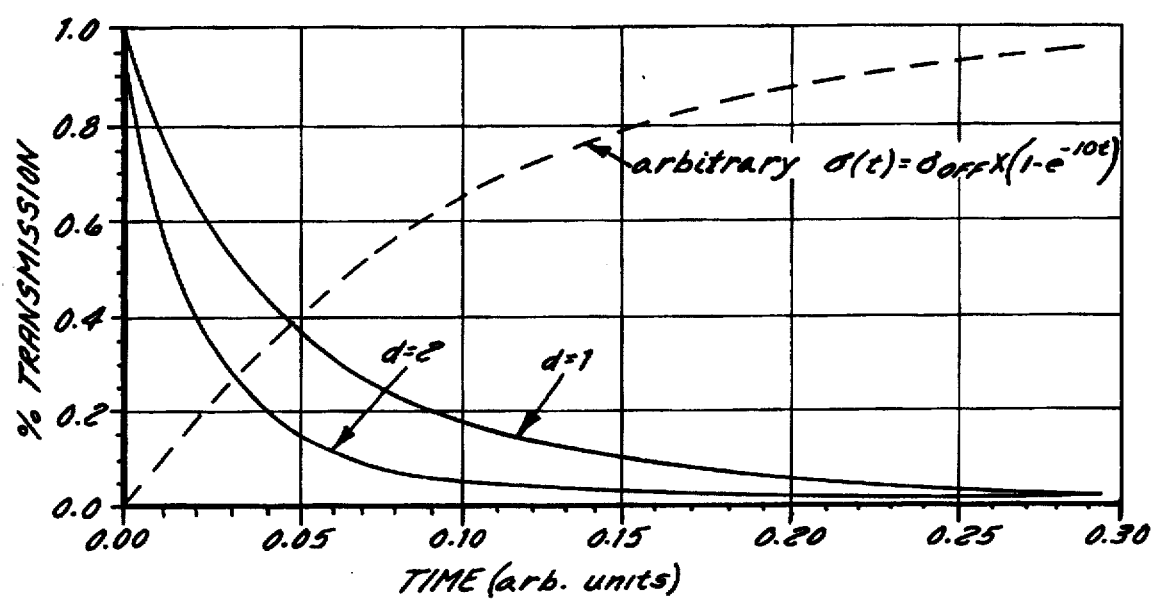
FIG. 12 illustrates the qualitative time dependence of optical transmittance through a polymer dispersed liquid crystal following the removal of the applied voltage for two sample thicknesses.

For different thicknesses, scattering is expected to vary exponentially with thickness. After the field is removed, the individual droplets relax back to their unaligned (scattering) state in a characteristic relation time. This leads to a time-dependent scattering cross section of the droplet, $\delta(t)$. Because of the exponential dependence of transmitted intensity on thickness, a given increase in scattering cross section will have a greater effect on transmission through a thicker film as shown in FIG. 12. Assuming an exponential time dependence of the scattering cross section (following experimental observations), we find that $$\sigma(t)=\sigma_{off}[1-\exp(-at)] \qquad (Eq.\ 9)$$

where $\delta_{off}$ is the off state scattering cross section and $a$ is a constant (set to 10 in FIG. 7). Clearly the PDLC, which is twice as thick, will have a faster turn-off time. The exact time dependence of $\delta(t)$, however, is not important.

Figure 13:
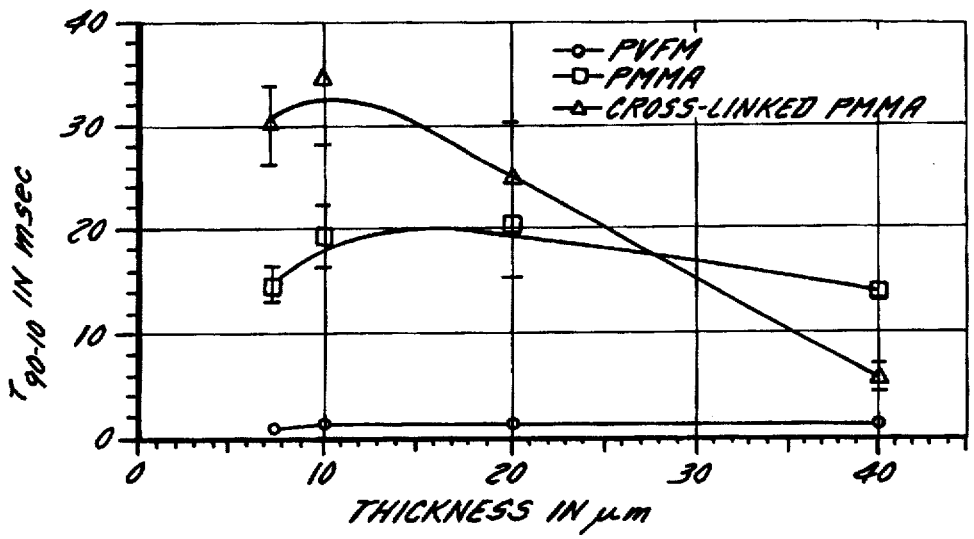
FIG. 13 illustrates off-time as a function of polymer dispersed liquid crystal thickness for three different systems.

FIG. 13 confirms that the turn-off time $\tau_{90-10}$ (from 90% to 10% of the increased transmittance) increases with decreasing thickness and for any simple form of $\delta(t)$. The rate of change is a function of the liquid crystal/polymer composition. This data shows that a PDLC based on polyvinyl formal polymer (PVFM) and E7 (BDH) liquid crystal mixture has a turn off time in the range of 1 to 2 msec. This value is constant in the measured range (10 to 40 μm). The other PDLC composite, polymethylmethacrylate (PMMA) with the same E7 (BDH) liquid crystal has $\tau_{90-10}$=20 msec at a 20 μm thickness.

Figure 14:
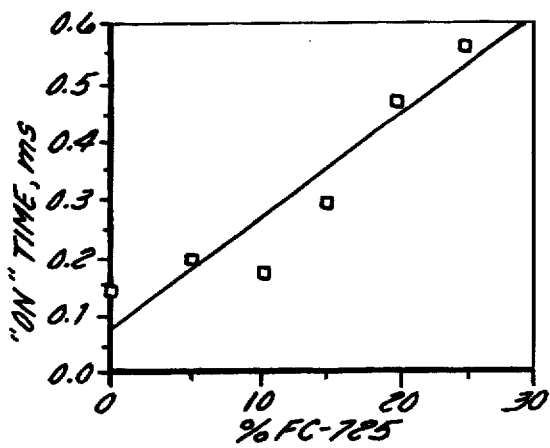
FIG. 14 illustrates on-time interpolated to a film thickness of 20 microns plotted as a function of the percent of a fluroralkylacralate polymer (FC-725) contained in the polymer binder.

The performance of polymer dispersed liquid crystal films based on PMMA can be altered by incorporating a fluorinated polymer of similar molecular structure into the droplet binder. For example, fluroralkylacralate polymer FC-725 can advantageously be used. Referring to the following table and FIGS. 14 and 15, electro-optical performance parameters of a PDLC film as a function of the composition of the polymer binder are linear functions.

Electro-Optical Performance Parameters of PDLC Films as a Function of the Composition of the Polymer Binder

| % FC-725 | Threshold Voltage, $V_t$ | "on"-Time ms | "off"-Time ms | Contrast Ratio |
|---|---|---|---|---|
| 0 | 29 | 0.141 | 22.5 | 20 |
| 5 | 40 | 0.189 | 25.2 | 9 |
| 10 | 34 | 0.172 | 22.6 | 41 |
| 15 | 43 | 0.293 | 10.8 | 30 |
| 20 | 72 | 0.462 | 5.1 | 36 |
| 25 | 79 | 0.559 | 3.7 | 31 |

Figure 15:
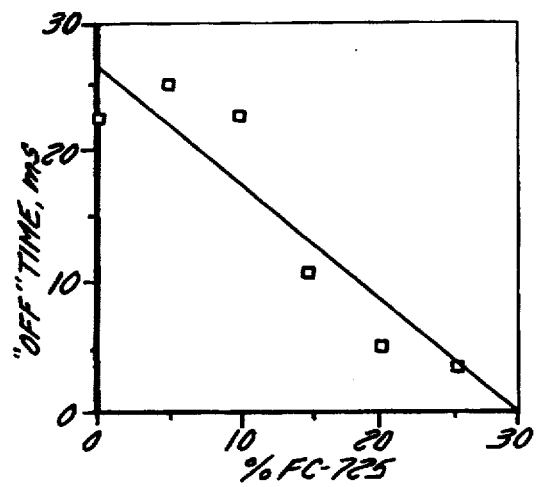
FIG. 15 illustrates off-time interpolated to a film thickness of 20 microns plotted as a function of the percent of fluroralkylacralate polymer contained in the polymer binder.

These results indicate that the "on" time increases and "off" time decreases with increasing amounts of FC-725 in the polymer binder. Referring to FIG. 15, it will be appreciated that the off time can be decreased below 5 msec with 25% FC-725 in the polymer binder. Since off-times are relatively longer, the improvement caused by the incorporation of the FC-725 can be regarded as significant, despite the concurrent increase in "on" time, which is still less than 1 ms.

Without being bound by theory, it appears that the above-described approach should provide an average sum "on-off" (switching) time in the range of milliseconds. Moreover, there is a possibility to improve switching time by varying droplet size and shape as well as the parameters of applied voltage which include shape, RMS value and dual (low and high) frequency combinations.

When analyzing display information capacity requirements, the projector bus real-time throughput can be shown to be $$R=9x\cdot y\cdot N \qquad (Eq.\ 10)$$

where x is the horizontal resolution (in number of pixels), y is the vertical resolution, and N is the number of layers in the volumetric screen. The following table shows the bus throughput for various numbers of layers at different resolutions.

Volumetric resolution is proportional to the number of layers in the volumetric screen (longitudinal resolution) and must be processed in the same time (1/30 sec), according to the persistence of vision requirements. However, higher resolution requires a faster image processing board, as shown in the following table.

Interface Throughput Requirement as a Function of Volumetric Resolution

| Number of Layers in Volumetric Screen N | Horizontal Resolution X | Vertical Resolution Y | Projector Bus Throughput R, MB/sec |
|---|---|---|---|
| 20 | 128 | 128 | 29.5 |
| 30 | 128 | 128 | 44.25 |
| 50 | 128 | 128 | 73.15 |
| 20 | 256 | 156 | 118 |
| 30 | 256 | 156 | 177.5 |
| 50 | 256 | 156 | 295 |
| 20 | 239 | 372 | 160 |
| 30 | 239 | 372 | 240 |
| 50 | 239 | 372 | 400 |

Figure 16:
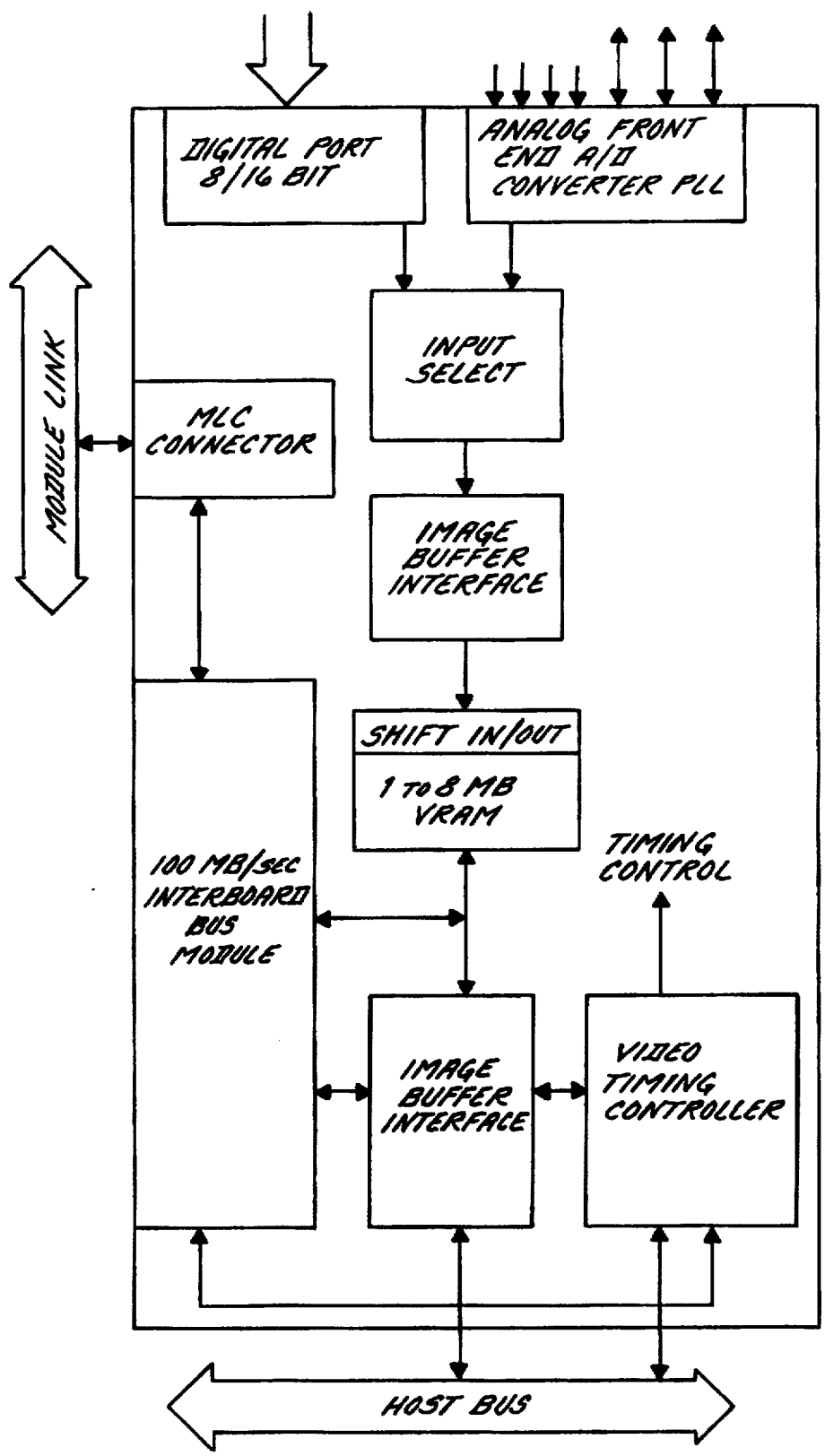
FIG. 16 illustrates a block diagram of a commercially available frame grabber, appropriately labeled prior art.

FIG. 16 shows a block diagram of the readily commercially available IMAGRAPH—HI*DEF III frame grabber. The optional 100 MB/sec interboard bus module conforming to the media-link controller (MLC) interconnect specification, has bulk memory expansion boards (up to 1 GB DRAM) and custom OEM modules. For a volumetric screen with 17 layers, the frame grabber's 100 MB/sec throughput produces 256×256 pixel resolution.

In addition to the frame switching considerations discussed above, a key element in the display is the high frame rate projector. In order to achieve the desired kilohertz frame rate, a spatial light modulator (SLM) is employed to generate a two-dimensional image for projection onto the volumetric screen 160. As noted above, some of the improved spatial light modulators rely on the electro-optical properties of ferroelectric liquid crystals (FLC). FLC respond to a modest voltage with large refractive index changes ($\Delta n$= 0.12). Room temperature response times for typical materials are 30 msec at 15 volts or 20 msec at 2 volts, making the FLC electro-optic effect compatible with dry voltage from ordinary integrated circuits.

Optimized PDLC screens and high frame-rate image digitizers and image projectors permit 3-D image projection and real volume visualization with no moving parts. Steady progress in electronic image processing and spatial light modulating technology will significantly lower the price of manufacturing such a display in the near future.

All the disclosed embodiments are useful in conjunction with visualization systems such as are used for the purpose of modeling geographic areas for educational training, or for the purpose of controlling air traffic, or for the purpose of remotely controlling robots, submersibles, satellites and shuttles, or for the purpose of providing educational, videogame, and interactive multimedia presentations or the like. There are virtually innumerable uses for the present invention, all of which need not be detailed here. All the disclosed embodiments can be realized without undue experimentation.

Although the best mode contemplated by the inventors of carrying out the present invention is disclosed above, practice of the present invention is not limited thereto. It will be manifest to those of ordinary skill in the art that various additions, modifications and rearrangements of the features of the present invention may be made without deviating from the spirit and scope of the underlying inventive concept.

For example, the display could be enhanced by providing a curved screen. Similarly, although ITO is preferred for the electrodes, any other suitable material could be used in its place. Similarly, the individual components need not be constructed of the disclosed materials or be formed in the disclosed shapes, but could be provided in virtually any configuration which employs PDLC so as to provide a volumetric display. Specifically, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A volumetric multi-layer screen for displaying uninterrupted full motion true-volume three-dimensional images with real physical depth cues, said volumetric multi-layer screen comprising:

a plurality of electrically switchable layers that are stacked and coextensive, said plurality of electrically switchable layers being electrically switchable fast enough to produce uninterrupted full motion true-volume three-dimensional images with real physical depth cues, and each of said plurality of electrically switchable layers including a first transparent dielectric substrate having a first side and a second side;

a first transparent electrode coated on said first side of said first transparent substrate; and an electrically switchable polymer dispersed liquid-crystal film coated on said first transparent electrode, said electrically switchable polymer dispersed liquid-crystal film including a) a host polymer having an index of refraction and b) a nematic liquid crystal having i) an ordinary index of refraction that substantially matches the index of refraction of the host polymer when an electric field is applied across said electrically switchable polymer dispersed liquid-crystal film from said first transparent electrode and ii) an extraordinary index of refraction that causes visible light to be scattered at a host polymer/nematic liquid crystal interface when said electric field is not applied across said electrically switchable polymer dispersed liquid-crystal film by said first transparent electrode.

2. The volumetric multi-layer screen of claim 1, wherein said first transparent electrode includes indium tin oxide.

3. The volumetric multi-layer screen of claim 1, wherein said host polymer includes at least 20% by weight fluorinated polymer and said electrically switchable polymer dispersed liquid-crystal film has an off-time of less than approximately 10 milliseconds.

4. The volumetric multi-layer screen of claim 1, wherein transmission of visible light through said electrically switchable polymer dispersed liquid-crystal film is at least approximately 90% when said electric field is applied across said electrically switchable polymer dispersed liquid-crystal film from said first transparent electrode.

5. The volumetric multi-layer screen of claim 1, wherein said plurality of electrically switchable layers includes at least 20 electrically switchable layers.

6. The volumetric multi-layer screen of claim 1, wherein total optical transmission through said plurality of electrically switchable layers is at least approximately 5%.

7. The volumetric multi-layer screen of claim 1, wherein each said electrically switchable polymer dispersed liquid crystal film is disposed adjacent to and between said first transparent electrode and a second transparent electrode.

8. The volumetric multi-layer screen of claim 7, wherein said second transparent electrode includes indium tin oxide.

9. The volumetric multi-layer screen of claim 7, wherein said host polymer includes at least 20% by weight fluorinated polymer and said electrically switchable polymer dispersed liquid-crystal film has an off-time of less than approximately 10 milliseconds.

10. The volumetric multi-layer screen of claim 1, wherein each of said plurality of electrically switchable layers includes a cover assembly laminated to said electrically switchable polymer dispersed liquid-crystal film, said cover assembly including a second transparent dielectric substrate and a second transparent electrode coated on said second transparent dielectric substrate, said second transparent electrode being adjacent said electrically switchable polymer dispersed liquid-crystal film.

11. The volumetric multi-layer screen of claim 10, wherein said first transparent electrode includes indium tin oxide and said second transparent electrode includes indium tin oxide.

12. The volumetric multi-layer screen of claim 10, wherein said host polymer includes at least 20% by weight fluorinated polymer and said electrically switchable polymer dispersed liquid-crystal film has an off-time of less than approximately 10 milliseconds.

13. A volumetric multi-layer screen of claim 1, wherein said electrically switchable polymer dispersed liquid crystal film comprises a dual frequency addressable liquid crystal mixture that can be driven by the alteration of sequential low and high frequency fields.

14. A volume visualization display system comprising:

a volumetric screen controller;

a projector interface connected to said volumetric screen controller;

a volumetric screen interface connected to said volumetric screen controller; a liquid-crystal spatial light modulator color projector connected to said projector interface; and a volumetric screen monitor connected to said volumetric screen interface, wherein said volumetric screen monitor includes a volumetric multi-layer screen, said volumetric multi-layer screen including a plurality of electrically switchable layers that are stacked and coextensive, each of said plurality of electrically switchable layers including:

a first transparent dielectric substrate having a first side and a second side;

a first transparent electrode coated on said first side of said first transparent substrate; and an electrically switchable polymer dispersed liquid-crystal film coated on said first transparent electrode, said electrically switchable polymer dispersed liquid-crystal film including a) a host polymer having an index of refraction and b) a nematic liquid crystal having i) an ordinary index of refraction that substantially matches the index of refraction of the host polymer when an electric field is applied across said electrically switchable polymer dispersed liquid-crystal film from said first transparent electrode and ii) an extraordinary index of refraction that causes visible light to be scattered at a host polymer/nematic liquid crystal interface when said electric field is not applied across said electrically switchable polymer dispersed liquid-crystal film by said first transparent electrode.

15. A method comprising:

fabricating a plurality of electrically switchable layers, said plurality of electrically switchable layers being fabricated so as to be electrically switchable fast enough to produce uninterrupted full motion true-volume three-dimensional images with real physical depth cues; and laminating the plurality of electrically switchable layers together so that said plurality of electrically switchable layers are stacked and coextensive, wherein fabricating the plurality of electrically switchable layers includes, for each of the plurality of electrically switchable layers comprises, providing a first transparent substrate having a first side and a second side;

coating said first side of said transparent substrate with a first transparent electrode; and forming an electrically switchable polymer dispersed liquid-crystal film on said first transparent electrode, said electrically switchable polymer dispersed liquid-crystal film including a) a host polymer having an index of refraction and b) a nematic liquid crystal having i) an ordinary index of refraction that substantially matches the index of refraction of the host polymer when an electric field is applied across said electrically switchable polymer dispersed liquid-crystal film from said first transparent electrode and ii) an extraordinary index of refraction that causes visible light to be scattered at a host polymer/nematic liquid crystal interface when said electric field is not applied across said electrically switchable polymer dispersed liquid-crystal film by said first transparent electrode.

16. The method of claim 15, wherein forming said electrically switchable polymer dispersed liquid-crystal film on said first transparent electrode includes coating said host polymer onto said first transparent electrode and permeating pores in said host polymer with said nematic liquid crystal.

17. The method of claim 14, wherein forming said electrically switchable polymer dispersed liquid-crystal film on said first transparent electrode includes mixing said nematic liquid crystal with a water soluble polymer and a solvent to form a solution, coating said mixture onto said first transparent electrode and evaporating said solvent.

18. The method of claim 15, wherein forming said electrically switchable polymer dispersed liquid-crystal film on said first transparent electrode includes emulsifying said nematic liquid crystal in an aqueous solution of polymer matrix to form an emulsion, coating said emulsion onto said first transparent conductive electrode and drying said emulsion.

19. The method of claim 15, wherein said electrically switchable polymer dispersed liquid crystal film comprises a dual frequency addressable liquid crystal mixture that can be driven by the alteration of sequential low and high frequency fields.

20. A method comprising:

fabricating a plurality of electrically switchable layers; and laminating the plurality of electrically switchable layers together so that said plurality of electrically switchable layers are stacked and coextensive, wherein fabricating the plurality of electrically switchable layers includes, for each of the plurality of electrically switchable layers, providing a first transparent substrate having a first side and a second side;

coating said first side of said transparent substrate with a first transparent electrode; and forming an electrically switchable polymer dispersed liquid-crystal film on said first transparent electrode, said electrically switchable polymer dispersed liquid-crystal film including a) a host polymer having an index of refraction and b) a nemnatic liquid crystal having i) an ordinary index of refraction that substantially matches the index of refraction of the host polymer when an electric field is applied across said electrically switchable polymer dispersed liquid-crystal film from said first transparent electrode and ii) an extraordinary index of refraction that causes visible light to be scattered at a host polymer/nematic liquid crystal interface when said electric field is not applied across said electrically switchable polymer dispersed liquid-crystal film by said first transparent electrode, and wherein forming said electrically switchable polymer dispersed liquid-crystal film on said first transparent electrode includes emulsifying said nematic liquid crystal in an aqueous solution of a polymer matrix to form a first emulsion, forming a second emulsion, mixing said first emulsion and said second emulsion to form a complex emulsion, coating said complex emulsion onto said first transparent conductive electrode and drying said complex emulsion.

21. A method comprising:

a) providing a volumetric multi-layer screen with a plurality of electrically switchable layers, each of said plurality of electrically switchable layers including:

a first transparent dielectric substrate having a first side and a second side;

a first transparent electrode coated on said first side of said first transparent substrate; and an electrically switchable polymer dispersed liquid-crystal film coated on said first transparent electrode, said electrically switchable polymer dispersed liquid-crystal film including A) a host polymer having an index of refraction and B) a nematic liquid crystal having i) an ordinary index of refraction that substantially matches the index of refraction of the host polymer when an electric field is applied across said electrically switchable polymer dispersed liquid-crystal film from said first transparent electrode and ii) an extraordinary index of refraction that causes visible light to be scattered at a host polymer/nematic liquid crystal interface when said electric field is not applied across said electrically switchable polymer dispersed liquid-crystal film by said first transparent electrode;

b) generating i) a first cross-section perpendicular to a direction of viewing from a stored three dimensional image and ii) a second cross-section perpendicular to said direction of viewing from said stored three dimensional image; c) applying a first electric field to a first of said electrically switchable layers so as to switch said first of said electrically switchable layers to a first optically transparent state;

d) projecting said first cross-section through said first of said electrically switchable layers;

e) removing said first electric field from said first of said electrically switchable layers so as to switch said first of said electrically switchable layers to a first optically diffuse state;

f) applying a second electric field to a second of said electrically switchable layers so as to switch said second of said electrically switchable layers to a second optically transparent state;

g) projecting said second cross-section through said first of said electrically switchable layers;

h) removing said second electric field from a second of said electrically switchable layers so as to switch said second of said electrically switchable layers to a second optically diffuse state; and i) repeating b), c), d), e), f), g) and h).

22. The method of claim 21, wherein repeating b), c), d), e), f), g) and h) takes place at least approximately 30 times each second.

* * * * *

UNITED STATES PATENT AND TRADEMARK OFFICE
CERTIFICATE OF CORRECTION

PATENT NO. : 5,764,317

DATED : June 9, 1998

INVENTOR(S) : Sadovnik, et al

It is certified that error appears in the above-identified patent and that said Letters Patent is hereby corrected as shown below:

Column 13 line 8, change "figure 7" to -- figure 12 --.

Signed and Sealed this

Ninth Day of February, 1999

Attest:

Attesting Officer

Acting Commissioner of Patents and Trademarks